United States Patent
Chien

(10) Patent No.: US 8,117,430 B2
(45) Date of Patent: Feb. 14, 2012

(54) BOOT TEST SYSTEM AND METHOD THEREOF

(75) Inventor: Yu-Feng Chien, Rueifang Township, Taipei County (TW)

(73) Assignees: Universal Scientific Industrial (Shanghai) Co., Ltd., Shanghai (CN); Universal Global Scientific Industrial Co., Ltd., Nantou County (TW)

( * ) Notice: Subject to any disclaimer, the term of this patent is extended or adjusted under 35 U.S.C. 154(b) by 835 days.

(21) Appl. No.: 12/153,544

(22) Filed: May 21, 2008

(65) Prior Publication Data

US 2009/0292911 A1 Nov. 26, 2009

(51) Int. Cl.
G06F 9/00 (2006.01)
G06F 15/177 (2006.01)

(52) U.S. Cl. .......................................................... 713/2
(58) Field of Classification Search ........................ 713/2
See application file for complete search history.

(56) References Cited

U.S. PATENT DOCUMENTS

| 7,389,088 B2* | 6/2008 | Kim .............................. 455/41.1 |
| 7,757,105 B2* | 7/2010 | Okazaki ......................... 713/300 |
| 2002/0091850 A1* | 7/2002 | Perholtz et al. ................ 709/231 |
| 2004/0148532 A1* | 7/2004 | Bell ............................... 713/300 |
| 2005/0097369 A1* | 5/2005 | Bowser et al. ................ 713/300 |
| 2008/0252478 A1* | 10/2008 | Katsuyama .............. 340/825.22 |
| 2009/0002152 A1* | 1/2009 | Chung ...................... 340/539.11 |

* cited by examiner

*Primary Examiner* — Mohammed Rehman
(74) *Attorney, Agent, or Firm* — Rosenberg, Klein & Lee

(57) ABSTRACT

A boot test system applied to test a cold boot in a target computer is provided. The boot test system includes a host computer and an autorun module. The host computer is used to test the target computer to turn power on/off and output a power-on signal and a power-off signal to the target computer based on a feedback signal. The autorun module installed in the target computer is used to output the feedback signal to the host computer during the boot of the target computer. Whereby, the present invention retains a fail result of the boot of the target computer for debugging by a worker.

5 Claims, 3 Drawing Sheets

BOOT TEST SYSTEM AND METHOD THEREOF

BACKGROUND OF THE INVENTION

1. Field of the Invention

The present invention relates to a test system; in particular, to a boot test system and method thereof for cold boot test executed by a computer.

2. Description of Related Art

For manufacturers of computer system, quality of computer delivered from factory is under strict control, and it is necessary to perform a series of tests before delivery, so as to assure the stability and reliability of quality. Among these tests, one of them is about cold boot test operations, whose method is to repeatedly execute actions of power on and power off once in a certain time interval, testing whether the computer booting is operable; for example, if a computer is able to boot to start the operating system, then it is considered as a normal boot.

Referring now to FIG. 1, a diagram of prior art computer boot test is shown, wherein the tester 8 is used to perform cold boot on the target computer 9. The tester 8 and the target computer 9 are linked with signal transmission lines (not shown), allowing the tester 8 to output power control signals to repeatedly perform boot test on the target computer 9, and inside the target computer 9 there installs a counter program to count the number of successful boots that the current target computer 9 has executed.

Hence, when the tester 8 starts to perform cold boot test on the target computer 9, the tester 8 incessantly performs reboot test on the target computer 9 in a plurality of times; meanwhile, the counter program inside the target computer 9 also automatically accumulates the current number of successful boots. Therefore, upon completion of all number of boot tests applied on the target computer 9 by the tester 8, an operator may read the count finally accumulated in the counter program inside the target computer 9, and determine whether the boot function of the current target computer 9 is stable based on the acquired count. For instance, in case that the tester 8 performs 100 times of reboot tests on the target computer 9, but the accumulated count in the counter program is less than 100 and exceeds by a certain amount, then it can be determined that the said target computer 9 provides poor boot stability, and the operator needs to perform relevant hardware debug works on the target computer 9, so as to assure the product quality of the target computer 9.

However, the aforesaid approach of computer cold boot test relies on professional testers, and, during the test, suppose the target computer is not able to boot normally, the current error conditions can not be retained, but restarted during the next reboot test. As a result, the above-mentioned issues need to be addressed.

SUMMARY OF THE INVENTION

The object of the present invention is to provide a boot test system and method thereof, so as to resolve the problems of high test cost caused by employing professional testers in prior art, and unable to retain the target computer at the conditions when test errors occur. Therefore, the present invention does not need to additionally purchase professional testers; but, instead, is able to perform test operations on a target computer through a host computer, reducing the cost for tester procurement; at the same time, during the test, it is possible to maintain error conditions of abnormal booting occurred on the target computer for the use of later debug and analysis by operators, and to record the number of tests accomplished at the occurrence of the present error.

To resolve the above-mentioned technical issues, a method according to the present invention provides a boot test system suitable for performing a cold boot test on at least one target computer, wherein the system comprises a host computer and an autorun module. The host computer controls the target computer to power on or power off, and outputs a power-on signal and a power-off signal to the target computer based on a feedback signal, so as to perform boot test thereon. The autorun module is installed in the target computer, which can output the feedback signal to the host computer during the boot test of the target computer.

In an embodiment of the present invention, the host computer comprises: a signal generating module, which is used to output the power-on signal and power-off signal to the power switch in the target computer; and a control module, which controls the signal generating module to output the power-on signal such that the target computer starts to boot, and, after the target computer booting, determines whether the feedback signal is received; in case that it is determined YES, and the number of computer boots has not yet reached a number of boot tests, then the control module first controls the signal generating module to output the power-off signal to shut down the target computer, and then controls the signal generating module to output the power-on signal to enable a next booting of the target computer.

In an embodiment of the present invention, the autorun module is used to automatically output the feedback signal to the host computer when the execution of boot test by the target computer has reached the operating system.

To address the technical problems described above, another solution according to the present invention provides a boot test method suitable for performing cold boot test on at least one target computer, wherein the method comprises:

(a) providing a host computer for performing the boot test;

(b) outputting a power-on signal through the host computer to a power switch of the target computer, enabling power on of the target computer;

(c) determining whether the target computer returns a feedback signal to the host computer;

(d) outputting a power-off signal to the target computer to shut down the target computer when the host computer receives the feedback signal;

(e) determining whether a number of computer boots in the target computer has reached a set number of boot tests; and (f) returning to step (b) and continuing the process when it is determined NO in step (e).

Therefore, through the above-mentioned implementation, the host computer of the present invention may, based on the feedback signal sent from the target computer, determine whether the current cold boot test of the target computer is normal, and if the host computer did not receive the feedback signal, then it may halt the next cold boot test to be performed on the target computer. When any abnormality does occur during the boot test on the target computer, the present error condition can be retained, facilitating operators to perform effective debug and analysis thereon immediately.

The above-mentioned summary as well as subsequent descriptions and appended drawings are all for further illustrating the measures, means and effects taken by the present invention to achieve the prescribed objectives. Other goals and advantages of the present invention will be explained in details in the following descriptions and drawings.

DETAILED DESCRIPTION OF THE PREFERRED EMBODIMENTS

Figure 1:
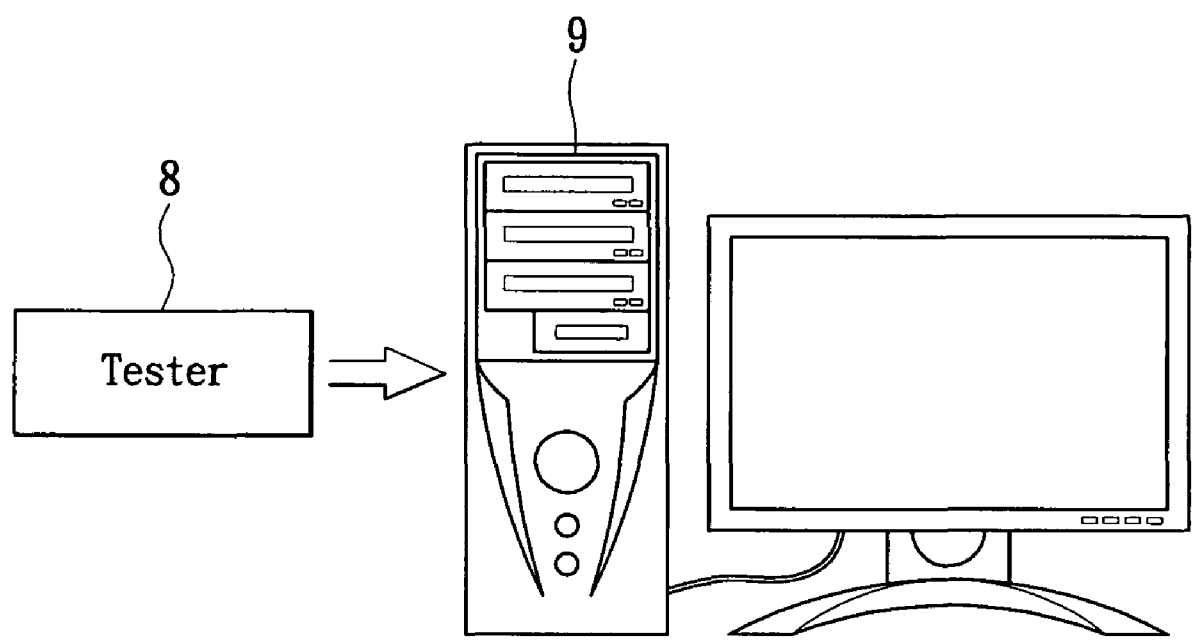
FIG. 1 illustrates a diagram of a computer boot test in prior art.

The present invention provides a means of boot test, which essentially performs cold boot tests on a target computer through a host computer, wherein the cold boot test is a process of repeatedly performing a plurality of cold boot operations on the target computer once in a certain time interval, so as to verify the boot stability and reliability of the target computer. The present invention allows the host computer and the target computer to perform bi-directional signal transmissions, enabling the host computer to, by means of the signal returned from the target computer, appreciate whether the cold boot process on the target computer is normal or not, such that the host computer may halt a next cold boot test when the cold boot process on the target computer is abnormal, allowing the target computer to retain the error conditions occurred during the cold boot process for facilitating debug and analysis executed by operators.

Subsequently, refer now to FIG. 2, which shows a functional block diagram of a boot test system according to a preferred embodiment of the present invention. The boot test system described in the present embodiment comprises a host computer 1 and an autorun module 30, in which the host computer 1 is used to perform a plurality of cold boot tests on a target computer 3, and, by means of signal output, control the power on and power off in the target computer 3, such that the target computer 3 may perform cold boot actions. Meanwhile, the autorun module 30 is installed in the target computer 3, and may actively output a feedback signal to the host computer 1 when operation of cold boot in the target computer 3 is normal, allowing the host computer 1 to perform the next cold boot test on the target computer 3.

Herein the one cold boot test action referred in the present embodiment is a complete process consisting of first the execution of power on and boot in the target computer 3 then the execution of power off to the target computer 3, and during the process of cold boot test action, the host computer 1 determines whether the cold boot in the target computer 3 is normal, and decides whether the next cold boot test should be performed according to the determination.

In the following descriptions, the internal operations of the host computer 1 will be explained, wherein the host computer 1 further comprises a control module 10, a signal generating module 12 and a first transmission module 14, in which the control module 10 controls the signal generating module 12 to generate a power-on signal and a power-off signal, and, through the first transmission module 14, outputs the power-on signal or power-off signal to a power switch 34 in the target computer 3. Additionally, the control module 10 may receive via the first transmission module 14 the feedback signal returned by the autorun module 30 for acknowledging whether the target computer 3 is able to normally perform the cold boot operation, and the host computer 1 in the present embodiment determines the present cold boot test on the target computer 3 to be normal based on the reception of the feedback signal. In practice, the host computer 1 of the present embodiment operates by means of a computer host, while the internal operations of the above-mentioned host computer 1 are also illustrated and described in terms of the portions related with the inventive technology; however, those skilled in the art can appreciate that the computer host employed in the specification may consist of other elements, which are well-known and not further explained in details.

Subsequently, the operations of the autorun module 30 will be illustrated. The autorun module 30 returns the signal to the host computer 1 essentially through a second transmission module 32 in the target computer 3, and the second transmission module 32 is coupled with the first transmission module 14. Furthermore, the power switch 34 in the target computer 3 is coupled with the first transmission module 14, enabling the power switch 34 to power on the target computer 3 based on the received power-on signal, or to power off the target computer 3 based on the received power-off signal.

In practice, the autorun module 30 in the present embodiment is implemented by designing an autorun program in the runtime environment of a boot operating system, such that the autorun program can be run automatically when the execution of booting the target computer 3 reaches the portions of the boot operating system, and automatically call a return program to send out the feedback signal to the host computer 1. The approach to design the above-mentioned autorun module 30 is that, after cold boot, the Basic Input/Output System (BIOS) executes first the Power On Self Test (POST) to test if the hardware in the computer is workable, and when the test result indicates yes, it transfers the control to the boot operating system located in the boot position on a subsequently assigned hard drive to continue the execution; in other word, after the transition of control to the boot operating system, it is possible to reflect whether the hardware installed within the current computer is normal. Hence, the present embodiment employs this approach to confirm the present cold boot test is normal when the autorun module 30 automatically executes.

Furthermore, the first transmission module 14 and the second transmission module 32 in the aforementioned embodiment are implemented by means of a RS-232 communication interface in the computer, so as to use the existing hardware resources to perform signal transmissions, and, meanwhile, to reduce building cost of the boot test system.

Figure 2:
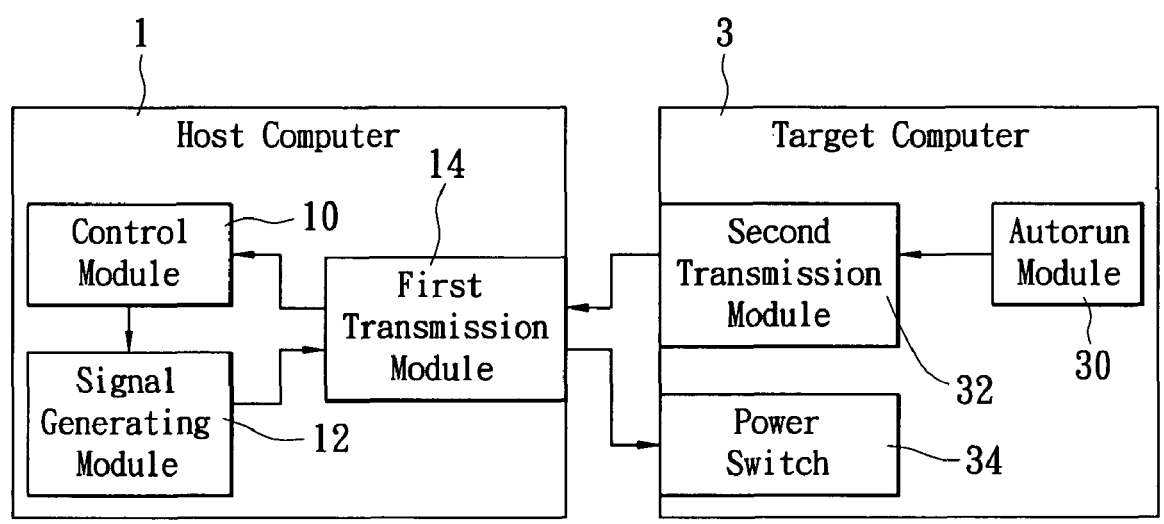
FIG. 2 illustrates a block diagram of a boot test system according to a preferred embodiment of the present invention.
Figure 3:
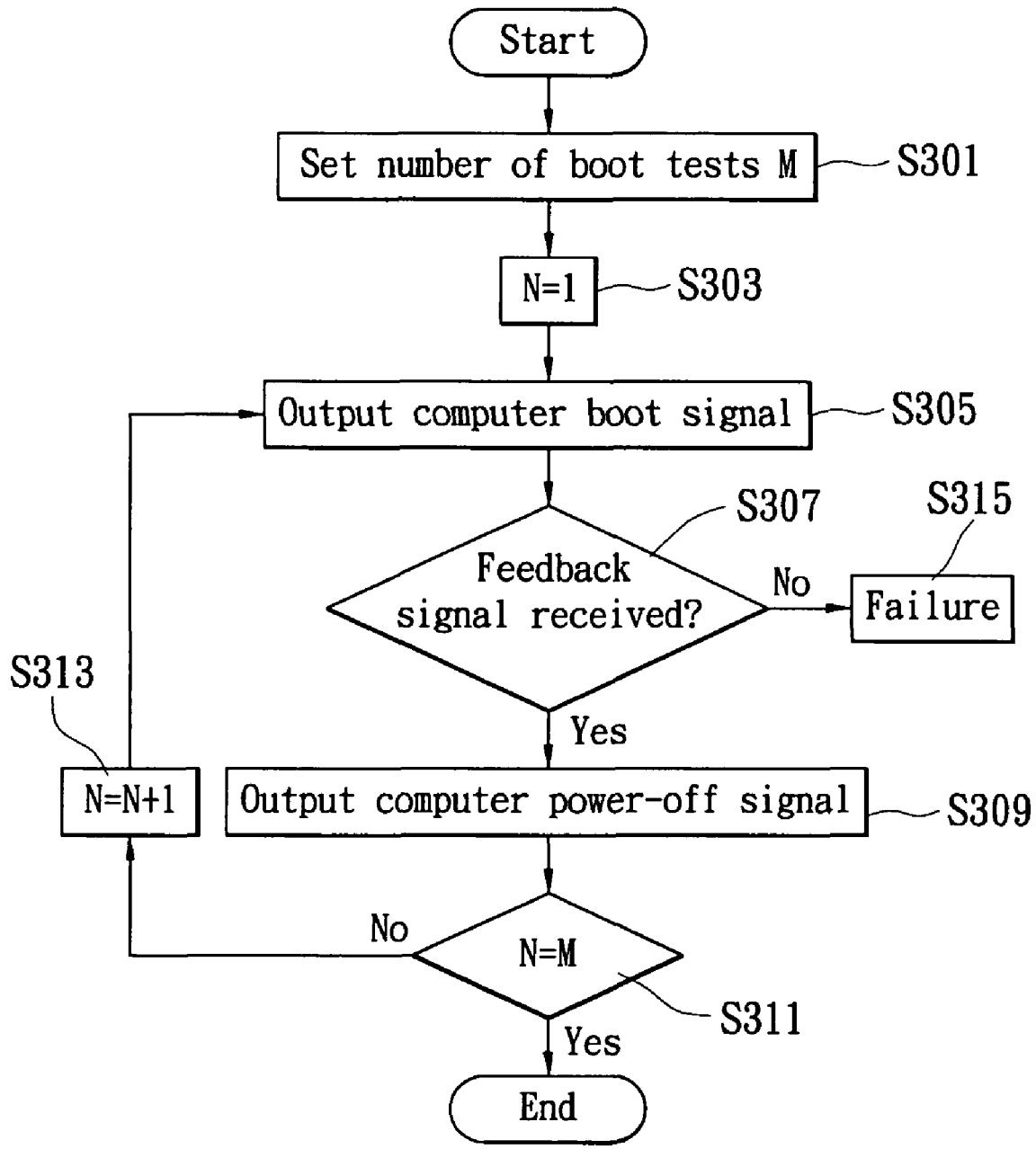
FIG. 3 illustrates a flowchart of a boot test method according to a preferred embodiment of the present invention.

Refer now to FIG. 3, in conjunction with FIG. 2, wherein FIG. 3 shows a flowchart of the boot test method according to a preferred embodiment of the present invention, whose execution step comprise:

For the host computer 1, it is possible to appoint, through the control module 10, a set number of cold boot tests M (as step S301), then let N=1 (as step S303), where N is used to record the number of cold boot tests that the host computer 1 has executed so far. Next, the host computer 1 outputs the power-on signal to the target computer 3 (as step S305), such that the target computer 3 powers on based on the received power-on signal. Then the host computer 1 determined whether the feedback signal returned by the target computer 3 is received (as step S307); in case the determination in step S307 indicates yes, this means the current cold boot test on the target computer 3 is normal, thus the host computer 1 then outputs the power-off signal to the target computer 3 (as step S309), such that the target computer 3 powers off based on the received power-off signal, and the current cold boot test on the target computer 3 is completed. Following this, the host computer 1 determines whether the current N is greater than M (as step S311); if the determination in step S311 is negative, then it means the host computer 1 has not yet finished all required number of cold boot tests, hence lets N=N+1 (as step S313) and returns to step S305 to continue the next cold boot test.

However, in the flowchart of FIG. 3, if the determination in step S307 indicates no, which means the current cold boot test is not normal during execution, it hence recognizes the occurrence of failure in the target computer 3 (as step S315); as a result, the host computer 1 halts a next cold boot test, so that the conditions of failure occurred in the target computer 3 can be retained, further facilitating operators to perform trouble-shooting jobs.

Additionally, the approach the host computer 1 executes step S307 is to determine whether the feedback signal is received within a range of wait time, wherein this range of wait time starts to count at the moment when the power-on signal is sent in step S307. The range of wait time can be set differently according to various processing speeds that the target computer 3 can provide.

Besides, in case that the determination in step S307 turns out to be negative, the host computer 1 may notify debugging personnel of the current failure occurred in the target computer 3 by means of outputting an alert signal, in which the alert signal may output sound signal through a speaker, or display signal as texts shown on a displayer.

The boot test system and method thereof disclosed in the aforementioned embodiment is implemented in an approach of a single host computer 1 to a single target computer 3; however, those skilled in the art appreciate that it is also possible to implement in a way of one host computer 1 to multiple target computers 3. For example, the host computer 1 can be provided with multiple first communication modules 14, each first transmission module 14 is respectively coupled with a target computer 3, and the host computer 1 can perform the described boot test respectively on each of the target computer 3 in a way disclosed in the above-mentioned embodiment.

In summary, the boot test system and method thereof according to the present invention provides the following technical features and enhancement in effect:

1. It employs essentially computers to perform test jobs and does not need expensive professional testers for computer cold boot test, therefore hardware cost required for test operation can be reduced.

2. In addition to one-to-one fashion for test execution, it is also possible to take the one-to-many approach, i.e. one host computer to multiple target computers, to perform the test jobs.

3. During the test, if the cold boot test of the target computer is abnormal, it can retain the target computer at the current error condition, facilitating debugging operators to execute trouble-shooting works.

4. During the test, if the cold boot test on the target computer is abnormal, the host computer can halt the cold boot test process, and send an alert message to notify operators for resolving the error occurred in the target computer.

The above-stated descriptions and drawings merely illustrate the embodiments of the present invention, and those skilled in the art can make various possible modifications in view of the descriptions disclosed in the present invention, while all such modifications are encompassed in the scope of the present invention delineated by the following claims.

What is claimed is:

1. A boot test system, which is used for performing a cold boot test on at least one target computer, comprising:
   a host computer, which controls the target computer to power on or power off, and outputs a power-on signal and a power-off signal to the target computer based on a feedback signal; and
   an autorun module, which is installed in the target computer, and outputs the feedback signal to the host computer when the target computer is powered on;
   wherein the autorun module outputs the feedback signal to the host computer when the cold boot test on the target computer is normal, and the autorun module is configured not to output the feedback signal to the host computer when the cold boot test on the target computer is abnormal;
   wherein the host computer further comprises a signal generating module, which is used to output the power-on signal and the power-off signal to a power switch in the target computer, and a control module, which controls the signal generating module to output the power-on signal allowing for the target computer to boot, and, after the target computer boots, determines whether the feedback signal is received, and when the feedback signal is received and a number of computer boots of the target computer has not reached a predetermined number, the control module first controls the signal generating module to output the power-off signal to shut down the target computer, and controls the signal generating module to output the power-on signal to enable a next booting of the target computer.

2. The boot test system according to claim 1, wherein the host
   computer uses a first transmission module to mutually communicate signals with a second transmission module in the target computer.

3. The boot test system according to claim 2,
   wherein the first transmission module and the second transmission module are RS-232 communication interfaces, respectively.

4. The boot test system according to claim 1,
   wherein the autorun module automatically outputs the feedback signal to the host computer when the target computer boots.

5. The boot test system according to claim 1,
   wherein if the control module does not receive the feedback signal, the control module controls the signal generating module to generate an alert signal.

\* \* \* \* \*